(12) United States Patent
Tachikawa et al.

(10) Patent No.: US 7,914,699 B2
(45) Date of Patent: Mar. 29, 2011

(54) LIQUID CRYSTAL RESIN, METHOD FOR MAKING THE SAME, LIQUID CRYSTAL RESIN COMPOSITION, AND MOLDED ARTICLE

(75) Inventors: Koji Tachikawa, Toyota (JP); Satoshi Matsubara, Ichihara (JP); Toru Yamanaka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 330 days.

(21) Appl. No.: 11/628,329

(22) PCT Filed: Nov. 25, 2004

(86) PCT No.: PCT/JP2004/017445
§ 371 (c)(1),
(2), (4) Date: Apr. 11, 2007

(87) PCT Pub. No.: WO2005/123804
PCT Pub. Date: Dec. 29, 2005

(65) Prior Publication Data
US 2007/0243376 A1    Oct. 18, 2007

(30) Foreign Application Priority Data

Jun. 22, 2004 (JP) ................................ 2004-183740
Aug. 25, 2004 (JP) ................................ 2004-244860
Aug. 25, 2004 (JP) ................................ 2004-245950

(51) Int. Cl.
*C09K 19/52* (2006.01)
*B32B 37/00* (2006.01)

(52) U.S. Cl. ........... 252/299.01; 264/172.11; 264/176.1; 264/171.21

(58) Field of Classification Search ............. 252/299.01; 428/1.33, 1.54; 264/172.11, 176.1, 171.21
See application file for complete search history.

(56) References Cited

U.S. PATENT DOCUMENTS

| 5,679,284 | A | * | 10/1997 | Kurita ...................... 252/299.01 |
| 5,767,223 | A |   | 6/1998  | Yamada et al. |
| 6,268,419 | B1 |  | 7/2001  | Murouchi et al. |

FOREIGN PATENT DOCUMENTS

| EP | 0 275 324 A1 | 7/1988 |
| EP | 0 926 175 A2 | 6/1999 |
| JP | 63-39918 A | 2/1988 |
| JP | 02-016150 A | 1/1990 |
| JP | 6-192407 A | 7/1994 |
| JP | 3309459 B2 | 7/1994 |
| JP | 11-263829 A | 9/1999 |
| JP | 2004-019021 | 1/2004 |
| JP | 2004-19021 A | 1/2004 |
| JP | 2004-256656 A | 9/2004 |

* cited by examiner

*Primary Examiner* — Lynda Salvatore
(74) *Attorney, Agent, or Firm* — Birch, Stewart, Kolasch & Birch, LLP (57) ABSTRACT

A liquid crystal resin comprises structural units derived from at least two types of aromatic diols. The liquid crystal resin generates 100 ppm or less of acetic acid gas, less than 20 ppm of phenol gas, and less than 100 ppm of carbon dioxide gas when the liquid crystal resin is retained at a melting point +10° C. (or at 335° C. when the melting point is less than 325° C.) for 30 minutes in a helium gas atmosphere. The present invention provides a liquid crystal resin or a composition containing this resin by which metal corrosion, clouding of glass, bulging of molded articles, and the like are reduced.

7 Claims, 1 Drawing Sheet

Fig. 1

LIQUID CRYSTAL RESIN, METHOD FOR MAKING THE SAME, LIQUID CRYSTAL RESIN COMPOSITION, AND MOLDED ARTICLE

TECHNICAL FIELD

The present invention relates to liquid crystal resins optimum for electric and electronic applications, methods for making the liquid crystal resins, liquid crystal resin compositions, and molded articles.

BACKGROUND ART

Demand for liquid crystal resins having excellent heat resistance, flowability, electric characteristics, etc., has increased especially for small precision molded articles for electric and electronic applications. Because liquid crystal resins have high thermal stability and high dimensional accuracy at high temperatures, investigations are recently carried out on the use liquid crystal resins in support substrates of heating components, liquid crystal display supporting substrates of office automation equipment and cellular phones, structural components of lamps, and the like.

In most of these applications, resins used come into contact with metal components, such as heating terminals; thus, the resins must not invade the metal components. However, most liquid crystal resins are synthesized by polycondensation by deacetylation or dephenolization and thus generate corrosive gas such as acetic acid or phenol. Accordingly, the use of these resins to the above-described applications has been limited.

With respect to supporting substrates of liquid crystal devices and the like, these gases cause problems such as clouding of display lenses. In particular, phenol gas having low volatility causes clouding such that the glass surface appears to have doubled. When these gasses are generated in large amounts, oligomers are released together with these gasses via the same decomposition process, and clouding of glass surfaces occurs as a result.

In these applications, the resins are sometimes required to engage with surfaces of other components or to withstand the sliding operation with metal components. However, since liquid crystal resins are molded at a high temperature near a decomposition temperature, bulging sometimes occurs in the surface of the resulting molded product by generation of gas, thereby decreasing the yield.

In order to overcome these problems induced by the gasses, studies are conducted to improve the terminal groups of liquid crystal resins so as to decrease the amounts of gasses (for example, Patent Documents 1 to 3).

Patent Document 1: Japanese Unexamined Patent Application Publication No. 2-16150 (pp. 1-2)
Patent Document 2: Japanese Patent Publication No. 3309459 (pp. 1-2)
Patent Document 3: Japanese Unexamined Patent Application Publication No. 11-263829 (pp. 1-2)

DISCLOSURE OF THE INVENTION

Problems to be Solved by the Invention

The method set forth in Patent Document 1 increases the amounts of terminal carboxylic acid groups in the liquid crystal resin. However, it was found that this method disadvantageously increases the amount of carbon dioxide gas and degrades the mechanical properties of the liquid crystal resin.

Patent Document 2 teaches a method for reducing the acetic acid gas by decreasing the ratio of the acetylated hydroxyl terminals to the carboxylic acid terminals in the liquid crystal resin. According to this method, however, the generation of gas at about 200° C. can be improved but this method is not suitable when the amounts of generated gas need to be improved at a high temperature exceeding 330° C.

Patent Document 3 teaches a technique of overcoming the problem of corrosion induced by generated gas by compounding a liquid crystal resin with water to hydrolyze the acetylated hydroxyl group terminals to thereby increase the hydroxyl group terminals. This method, however, not only yields hydrolyzation of terminals but also decomposition of ester bonds in the polymer chains. Thus, the total amount of the terminal groups increases and the amounts of carbon dioxide gas and phenol gas do not sufficiently decrease. Furthermore, clouding of glass cannot be overcome due to increased amounts of oligomers.

An object of the present invention is to provide a liquid crystal resin that can reduce metal corrosion, clouding of glass, bulging of molded articles, and the like described above, a method for making such a liquid crystal resin, a liquid crystal resin composition, and molded articles prepared using the liquid crystal resin and the liquid crystal resin composition.

Means for Solving the Problem

The present inventors have conducted extensive investigations to overcome the problem and discovered a liquid crystal polyester that generates specifically low amounts of gas.

In particular, the present invention provides a liquid crystal resin including structural units derived from at least two types of aromatic diols, wherein the liquid crystal resin generates 100 ppm or less of acetic acid gas, less than 20 ppm of phenol gas, and less than 100 ppm of carbon dioxide gas when the liquid crystal resin is retained at a melting point +10° C. (or at 335° C. when the melting point is less than 325° C.) for 30 minutes in a helium gas atmosphere.

The present invention also provides a liquid crystal composition containing 100 parts by weight of the above-described liquid crystal resin and 30 to 200 parts by weight of a filler.

The present invention also provides a molded article prepared from the above-described liquid crystal resin or liquid crystal resin composition.

The present invention also provides a film comprising the above-described liquid crystal resin or liquid crystal resin composition.

The present invention also provides fibers comprising the above-described liquid crystal resin or liquid crystal resin composition.

The present invention also provides a method for making the above-described liquid crystal resin, including performing acetylation reaction between phenolic hydroxyl groups contained in a raw material comprising at least two types of aromatic diols and 1.03 to 1.09 mol equivalents of acid anhydride based on the total of the phenolic hydroxyl groups at a temperature of 140° C. to 150° C. for 2.1 to 2.9 hours; and subsequently performing polycondensation, wherein the acetylation reaction is performed until the residual amount of a monoacetyl derivative of an aromatic diol (A) determined from the equation below reaches 0.8 to 5 mol % of the amount of the aromatic diol (A) initially charged, the aromatic diol (A) being an aromatic diol in which the rate of conversion from monoacetyl derivatives to diacetyl derivative is the lowest among the aromatic diols:

Residual amount of monoacetyl derivative (mol %)=
{[monoacetyl derivative]/[monoacetyl derivative]+[diacetyl derivative])}×100 wherein [monoacetyl derivative] represents the molar amount of the monoacetyl derivatives of the aromatic diol (A), and [diacetyl derivative] represents the molar amount of the diacetyl derivatives of the aromatic diol (A).

ADVANTAGES OF THE PRESENT INVENTION

The liquid crystal resin of the present generates significantly small amounts of gas and is less likely to generate bulge in the surface of a molded article prepared using the liquid crystal resin. Moreover, when the molded article is used in combination with glass or plastic transparent components, no clouding will occur in these transparent components. When the molded article is brought into contact with metal components, the molded article does not corrode the metal components. Thus, the liquid crystal resin of the present invention is optimum for electric and electronic applications.

REFERENCE NUMERALS

1: Nozzle
2: Nozzle opening
3: Taper
4: Lead-in hole
5: Spinning hole
6: First straight portion at the lead-in hole side
7: Second straight portion at the spinning hole side
La: Length of the first straight portion
Lt: Length of the taper
Lb: Length of the second straight portion
Da: Diameter of the lead-in hole
Db: Diameter of the spinning hole
θ: Cone angle

BEST MODE FOR CARRYING OUT THE INVENTION

The essential structural units of the liquid crystal resin of the present invention are structural units derived from at least two types of aromatic diols. The liquid crystal resin generates 100 ppm or less of acetic acid gas, less than 20 ppm of phenol gas, and less than 100 ppm of carbon dioxide gas when the liquid crystal resin is retained at a melting point +10° C. (or at 335° C. when the melting point is less than 325° C.) for 30 minutes in a helium gas atmosphere. The amount of the acetic acid gas generated from the resin is preferably 80 ppm or less, more preferably 50 ppm or less, and most preferably 20 ppm or less. The amount of the phenol gas generated is preferably 10 ppm or less and more preferably 8 ppm or less. The amount of the carbon dioxide gas generated is preferably 80 ppm or less and more preferably 60 ppm or less.

Here, the melting point of the liquid crystal resin refers to an endothermic temperature $Tm_2$ observed according to the following differential calorific measurement process: after an endothermic peak temperature $Tm_1$ is observed by heating a synthesized polymer from room temperature at a heating rate of 20° C./min, the polymer is retained at a temperature of $Tm_1$ +20° C. for 5 minutes, cooled to room temperature at a cooling rate of 20° C./min, and heated again at a heating rate of 20° C./min during which the endothermic temperature $Tm_2$ is observed.

Since the amounts of acetic acid gas and phenol gas are reduced, corrosion of the metal components can be reduced and clouding of glass and the like can be prevented. Moreover, since the amounts of carbon dioxide gas are reduced, bulging and roughening of surfaces of molded articles can be avoided.

The amounts of acetic acid gas, phenol gas, and carbon dioxide gas generated can be determined by pyrolysis-gas chromatography-mass spectrometry (TG/GC-MS) analysis under a helium flow.

The liquid crystal resin of the present invention contains the structural units derived from at least two types of aromatic diols. Examples of the aromatic diols include 4,4'-dihydroxybiphenyl, hydroquinone, resorcinol, tert-butylhydroquinone, phenylhydroquinone, chlorohydroquinone, 2,6-dihydroxynaphthalene, 2,7-dihydroxynaphthalene, 3,4'-dihydroxybiphenyl, 2,2-bis(4-hydroxyphenyl)propane, and 4,4'-dihydroxydiphenyl ether. 4,4'-Dihydroxybiphenyl, hydroquinone, and 2,6-dihydroxynaphthalene are preferred, and 4,4'-dihydroxybiphenyl and hydroquinone are more preferred.

Preferred combinations of two types of aromatic diols are a combination of 4,4'-dihydroxybiphenyl and hydroquinone, a combination of 4,4'-dihydroxybiphenyl and 2,6-dihydroxynaphthalene, and a combination of hydroquinone and 2,6-dihydroxynaphthalene. The more preferable combination is a combination of 4,4'-dihydroxybiphenyl and hydroquinone.

In addition to the two aromatic diols, one or more aromatic diols may be used.

In the process of making the liquid crystal resin, acetylation reaction is yielded by reacting the phenolic hydroxyl groups in the monomer, i.e., the raw material, with an acetylating agent such as acetic anhydride (hereinafter this step is also referred to as "acetylation step") and then the resulting product is subjected to polycondensation. In the present invention, the acetylation reaction is preferably conducted at a temperature in the range of 140° C. to 150° C. As equipment for acetylation reaction, a reactor equipped with a reflux tube or a fractionating column may be used. The reaction time for acetylation is approximately 1 to 5 hours but differs with the raw material of the liquid crystal resin or the reaction temperature. The reaction time is preferably 2.1 to 2.9 hours. The reaction time decreases with the increasing reaction temperature. The reaction time also decreases with the increasing molar ratio of acetic acid anhydride to phenolic hydroxyl group terminals.

In general, when aromatic diols are subjected to acetylation reaction, one of the phenolic hydroxyl groups of the aromatic diol is first acetylated to produce a monoacetyl derivative, and then the monoacetyl derivative is converted to a diacetyl derivative as the acetylation process proceeds. In the present invention, "acetylation" refers to a concept of converting hydroxyl groups to acetyl groups and includes processes such as monoacetylation and diacetylation.

In the present invention, the at least two diol components used in combination preferably exhibit substantially the same reactivity during the monoacetylation reaction but different reactivity during the conversion from the monoacetyl derivative to the diacetyl derivative. For example, 4,4'-dihydroxybiphenyl and hydroquinone exhibit substantially the same monoacetylation reaction rate; however, hydroquinone exhibits a smaller reaction rate than that of 4,4'-dihydroxybiphenyl during the conversion from the monoacetyl derivative to the diacetyl derivative (hereinafter, this rate is referred to as "diacetylation reaction rate").

In this invention, the acetylation reaction is performed until the residual amount of the monoacetyl derivative of an aromatic diol (A) reaches 0.8 to 5 mol % of 100 mol % of the aromatic diol (A) initially charged, the aromatic diol (A) being an aromatic diol in which the rate of conversion from monoacetyl derivatives to diacetyl derivative is the lowest among the aromatic diols. Preferably, the acetylation reaction is performed until the residual amount reaches 1 to 3 mol % and more preferably 1.2 to 2.4 mol %.

The residual amount of the monoacetyl derivative is determined by the formula below:

Residual amount of monoacetyl derivative (%)= {[monoacetyl derivative]/[monoacetyl derivative]+[diacetyl derivative])}×100 wherein [monoacetyl derivative] represents the molar amount of the monoacetyl derivatives of the aromatic diol (A), and [diacetyl derivative] represents the molar amount of the diacetyl derivatives of the aromatic diol (A).

Note that an unreacted material in which neither of the two hydroxyl groups of the aromatic diol is acetylated readily undergoes monoacetylation. Thus, in the final stage of acetylation reaction, it is atypical that such a material remains in amounts that would affect the equation above. Thus, in the equation above, the total ([monoacetyl derivative]+[diacetyl derivative]) can be regarded as equal to the total moles of the aromatic diols charged.

Preferably, the residual amounts of the monoacetyl derivatives of the aromatic diols other than the aromatic diol (A) exhibiting the lowest diacetylation reaction rate, i.e., the residual amounts of the monoacetyl derivative of the aromatic diols exhibiting higher diacetylation reaction rates, are preferably less than 0.5 mol % relative to 100 mol % of these diols initially charged.

The ratio of the aromatic diol (A) to the other aromatic diols is preferably 10 to 40 mol % and more preferably 20 to 30 mol %.

The residual amount of the monoacetyl derivatives can be determined by the equation above. In particular, a portion of the reaction mixture after the acetylation step is sampled and subjected to $^1$H-nuclear magnetic resonance spectrometry. The amount can be calculated from the peak intensity as shown below. Here, the peak intensity corresponds to the area of the peak.

The observed peaks derived from the aromatic diols can be assigned to individual diols by peak resolution. Thus, the residual amount of the monoacetyl derivative can be determined for each aromatic diol component.

The amount can be calculated according to the following equation:

Residual amount of monoacetyl derivative (%)= [Ia/(Ia+Ib)]×100 wherein Ia represents the peak intensity assigned to the hydrogen atom bonded to the α carbon of the aromatic carbons bonded to the unacetylated hydroxyl group of the monoacetyl derivative of the aromatic diol, and Ib represents the peak intensity assigned to the hydrogen atom bonded to the α carbon of the aromatic carbons bonded to the acetyl group of the monoacetyl and diacetyl derivatives of the aromatic diol.

Moreover, as the model reaction, an aromatic diol whose residual amount of the monoacetyl derivative therefrom is desired to be determined is charged in a reactor, and acetic anhydride is added thereto at a molar ratio used in actual reaction. The model reaction is then carried out under actual reaction condition to determine the residual amount of the monoacetyl derivative. The same results as that obtained by conducting the calculation using the mixture can be obtained.

Typically, acetylation is conducted at sufficiently high acid anhydride molar ratio and reaction temperature for sufficiently long reaction time to reduce the residual amount of the monoacetyl derivative to substantially zero. In such a case, the number of acetylated hydroxyl group terminals is typically approximately the same as the number of the carboxyl group terminals of the terminals of the resulting liquid crystal resin. This possibly leads to ready generation of acetic acid gas, carbon dioxide gas, and phenol gas.

In the present invention, the inventors have found that when two or more aromatic diols are used in acetylation reaction, the amounts of residual monoacetyl derivatives therefrom differ between the individual aromatic diols. By controlling the amount of the residual monoacetyl derivative of the aromatic diol (A) exhibiting a lower diacetylation rate to 0.8 to 5 mol % relative to 100 mol % of the amount initially charged, phenolic hydroxyl groups of the aromatic diol preferentially occupy the terminals of the resulting liquid crystal resin during the polymerization. This is because the unacetylated phenolic hydroxyl groups have lower reactivity for polycondensation. In the present invention, the phenolic hydroxyl groups of the aromatic diol are at the terminals of the liquid crystal resin. Thus, the acetylated hydroxyl terminals that generate acetic acid gas and the carboxylic acid terminals derived from p-hydroxybenzoic acid that generates carbon dioxide and phenol gas can be reduced.

When acetylation is significantly incomplete, excessive amounts of monoacetyl derivatives of the aromatic diols will be generated, thereby decreasing the degree of polymerization and leading to failure of synthesizing the liquid crystal resin. Even when the liquid crystal resin is obtained, the amounts of phenol and carbon dioxide gas generated will be large because of the presence of the carboxyl group terminals in amounts substantially equal to the residual hydroxyl groups.

Therefore, a liquid crystal resin that generates improved amounts of phenol gas, acetic acid gas, and carbon dioxide gas can be obtained by the above-described control.

The essential structural units of the liquid crystal resin of the present invention are those derived from two or more aromatic diols. Other structural units are not particularly limited so long as the resulting liquid crystal resin generates gas in amounts within the limitation of the present invention.

Liquid crystal resins refer to resins that form anisotropic molten phases. Examples thereof include liquid crystal resins having ester bonds, such as liquid crystal polyester and liquid crystal polyesteramide.

Examples of the liquid crystal polyester include polyesters that form anisotropic molten phases, the polyesters each containing the structural units derived from the two or more aromatic diols described above and structural units selected from aromatic oxycarbonyl units, aromatic dicarbonyl units, ethylenedioxy units, and the like.

Examples of the aromatic oxycarbonyl unit include the structural units derived from p-hydroxybenzoic acid and 6-hydroxy-2-naphthoic acid. Among them, the structural units derived from p-hydroxybenzoic acid are preferable. Examples of the aromatic dicarbonyl unit include structural units derived from terephthalic acid, isophthalic acid, 2,6-naphthalenedicarboxylic acid, 4,4'-diphenyldicarboxylic acid, 1,2-bis(phenoxy)ethane-4,4'-dicarboxylic acid, 1,2-bis(2-chlorophenoxy)ethane-4,4'-dicarboxylic acid, and 4,4'-diphenyletherdicarboxylic acid. Among these, the structural units derived from terephthalic acid, isophthalic acid, and 2,6-naphthalenedicarboxylic acid are preferred. Examples of the ethylenedioxy unit include structural units derived from ethylene glycol.

Examples of the liquid crystal polyester include a liquid crystal polyester composed of a structural unit derived from p-hydroxybenzoic acid, a structural unit derived from 4,4'-dihydroxybiphenyl, a structural unit derived from hydroquinone, and a structural unit derived from terephthalic acid and/or isophthalic acid; a liquid crystal polyester composed of a structural unit derived from p-hydroxybenzoic acid, a structural unit derived from ethylene glycol, a structural unit derived from 4,4'-dihydroxybiphenyl, a structural unit derived from hydroquinone, and a structural unit derived from terephthalic acid and/or isophthalic acid; a liquid crystal polyester composed of a structural unit derived from p-hydroxybenzoic acid, a structural unit derived from hydroquinone, a structural unit derived from 4,4'-dihydroxybiphenyl, a structural unit derived from 2,6-naphthalenedicarboxylic acid, and a structural unit derived from terephthalic acid; and a liquid crystal polyester composed of a structural unit derived from p-hydroxybenzoic acid, a structural unit derived from 2,6-dihydroxynaphthalene, a structural unit derived from 4,4'-dihydroxybiphenyl, and a structural unit derived from terephthalic acid and/or isophthalic acid.

Particularly preferable examples of the liquid crystal polyester that form anisotropic molten phases include a liquid crystal polyester composed of structural units (I), (II), (III), and (IV) below:

The structural unit (I) represents a structural unit derived from p-hydroxybenzoic acid, the structural unit (II) represents a structural unit derived from 4,4'-dihydroxybiphenyl, the structural unit (III) represents a structural unit derived from hydroquinone, the structural unit (IV) represents a structural unit derived from terephthalic acid, and the structural unit (V) represents a structural unit derived from isophthalic acid.

The present invention will be described below using this liquid crystal polyester as an example.

The contents of the structural units (I), (II), (III), (IV), and (V) for copolymerization may be any but are preferably those described below in order to fully yield the effect of the present invention.

The content of the structural unit (I) for copolymerization is preferably 40 to 85 mol %, more preferably 65 to 80 mol %, and most preferably 68 to 75 mol % relative to the total content of the structural units (I), (II) and (III). The content of the structural unit (II) is preferably 60 to 90 mol %, more preferably 60, to 75 mol %, and most preferably 65 to 73 mol % relative to the total content of the structural units (II) and (III). The content of the structural unit (IV) is preferably 40 to 95 mol %, more preferably 60 to 92 mol %, and most preferably 72 to 92 mol % relative to the total of the structural units (IV) and (V).

These composition ranges are preferable because the resulting liquid crystal polyester will have an entropy of melting ($\Delta S$) in the preferable range described below.

The total content of the structural units (II) and (III) is preferably substantially equimolar to the total of the structural units (IV) and (V). Here, "substantially equimolar" means that they are equimolar as the units constituting the polymer main chain excluding the termini but not necessarily equimolar if the units constituting the termini are included in the count.

When these composition ranges are satisfied, the improvements in low gas property and bulging property, i.e., the effects of the present invention, are particularly noticeable.

A liquid crystal resin prepared from the structural units (I) to (V) in which 2,6-dihydroxynaphthalene is used instead of hydroquinone yielding the structural unit (III) is also preferable. In such a case, the structural unit (III) should be read as a structural unit derived from 2,6-dihydroxynaphthalene in the above description of the preferable contents of the structural units.

Moreover, liquid crystal resin prepared from the structural units (I) to (V) in which 2,6-naphthalenedicarboxylic acid is used instead of isophthalic acid that yields the structural unit (V) is also preferable. The preferable contents of the structural units are the same as those regarding the above-described structural unit (V).

These preferable liquid crystal polyesters may be copolymerized with a component other than the structural units (I) to (V) above as long as the liquid crystal properties and the characteristics are not adversely affected. Examples of such a component include aromatic dicarboxylic acid such as 3,3'-diphenyldicarboxylic acid and 2,2'-diphenyldicarboxylic acid; aliphatic dicarboxylic acid such as adipic acid, azelaic acid, sebacic acid, and dodecanedionic acid; alicyclic dicarboxylic acid such as hexahydroterephthalic acid; aromatic diols such as chlorohydroquinone, 3,4'-dihydroxybiphenyl, 4,4'-dihydroxydiphenylsulfone, 4,4'-dihydroxydiphenylsulfide, 4,4'-dihydroxybenzophenon, and 3,4'-dihydroxybiphenyl; aliphatic alicyclic diols such as propylene glycol, 1,4-butanediol, 1,6-hexanediol, neopentyl glycol, 1,4-cyclohexanediol, and 1,4-cyclohexanedimethanol; and m-hydroxybenzoic acid, p-aminobenzoic acid, and p-aminophenol.

The liquid crystal resin of the present invention preferably has an entropy of melting $\Delta S$ of $0.9 \times 10^{-3}$ J/g·K or less defined by formula [1] since the liquid crystal resin exhibits particularly high mechanical strength even when it is in a state near non-orientation:

$$\Delta S(\text{J/g·K}) = \Delta Hm(\text{J/g})/[Tm(°\text{C.})+273] \qquad [1]$$

wherein Tm is a temperature $Tm_2$ observed according to the following differential calorific measurement process: after an endothermic peak temperature $Tm_1$ is observed by heating a synthesized polymer from room temperature at a heating rate of 20° C./min, the polymer is retained at a temperature of $Tm_1$ +20° C. for 5 minutes, cooled to room temperature at a cooling rate of 20° C./min, and heated again at a heating rate of 20° C./min during which the endothermic temperature $Tm_2$ is observed. ΔHm is a melt heat ($\Delta Hm_2$) calculated from the endothermic peak area.

ΔS is preferably $0.9 \times 10^{-3}$ J/g·K or less, more preferably $0.7 \times 10^{-3}$ J/g·K or less, and most preferably $0.5 \times 10^{-3}$ J/g·K or less.

However, ΔS is never zero or minus; ΔS is a real number greater than zero.

In measuring ΔHm and Tm, if no peak is observed, ΔS cannot be calculated. A liquid crystal resin from which no peak is observed is assumed as outside the preferable ranges described above.

When ΔS is within the prescribed range, the molecular chains of the liquid crystal resin in a melt state and a solid state are well ordered. Thus, the molecular chains are rarely disordered and well oriented even without high orientation treatment during the molding process. Accordingly, a molded article having outstanding mechanical strength and heat resistance can be obtained.

A state in which molecular chains are well ordered is different from the sate having high crystallinity. The state of high crystallinity refers to a state in which the ratio of the crystal portion is increased as a result of low restriction from non-crystalline portion. In such a state, there is a large gap in state of molecular chains between the high-density crystal portion and low-density, less restricting non-crystalline portion. As a result, if a molded prepared is cured without providing orientation, disordered soft segments and hard segments will coexist at random, resulting in lower mechanical strength and heat resistance.

In contrast, when ΔS of the liquid crystal resin is in the above-described preferable range, the crystal portion and the non-crystal portion will not be disordered or exist at random. Instead, the molecules will be well aligned and all the molecular chains will show substantially the same state as a whole. Since the molecular chains are highly ordered, high mechanical strength and heat resistance can be yielded without imparting orientation.

In the crystal portion, the molecular chains are packed, i.e., the molecular chains are aligned at a high density, thereby decreasing the distance between the molecular chains. In the non-crystal portion, the distances between the molecular chains vary, and the difference between the largest distance and the smallest distance is significantly large. When ΔS of the liquid crystal resin is within the above-described preferable range, the distance between molecular chains is somewhere in the middle. Such a liquid crystal resin is preferable since it is adequately loose.

The crystallinity can be determined through determination of the melt heat (ΔH). The distance between molecular chains can be determined through the peak diffraction angle (2θ) in X-ray diffractometry using α-alumina as an internal standard, for example.

The melt viscosity of the liquid crystal resin of the present invention is preferably 10 to 500 Pa·s and more preferably 12 to 200 Pa·s. The melt viscosity is measured with a Koka flow tester at a melting point (Tm) +10° C. and a shear rate of 1000 (1/sec).

The melting point of the liquid crystal resin is controlled by the combination of the copolymer components. The melting point of the liquid crystal resin of the present invention is not particularly limited but is preferably 280° C. or more, more preferably 300° C. or more, and yet more preferably 310° C. or more, and most preferably 325° C. or more for applications requiring high heat resistance. The upper limit of the melting point is preferably the decomposition temperature of the liquid crystal resin −10° C. or lower. Since the decomposition temperature of the liquid crystal polyester described above is around 370° C., the melting point is preferably 360° C. or less.

The basic method for making the liquid crystal resin of the present invention is not particularly limited so long as the liquid crystal resin of the present invention is obtained. Preferably, the method includes the steps of, by using a liquid crystal resin material containing at least two types of aromatic diols and preferably aromatic hydroxycarboxylic acid, performing acetylation reaction of acetic anhydride and the phenolic hydroxyl groups, such as those of the aromatic hydroxycarboxylic acid and the aromatic diols, in the liquid crystal resins; and performing polycondensation of the resulting product and the remaining liquid crystal resin materials, such as aromatic dicarboxylic acid and other monomers. The polycondensation is preferably conducted at a temperature at which the liquid crystal resin melts under reduced pressure.

The amount of the acetic anhydride used is preferably 1.00 to 1.10 molar equivalents, more preferably 1.03 to 1.09 molar equivalents, and most preferably 1.05 to 1.08 molar equivalents to the total of the phenolic hydroxyl groups in the liquid crystal resin material used.

When the amount of the acetic anhydride is within the above-described, range, the residual amount of the monoacetyl derivatives of the aromatic diol in the acetylation step can be easily controlled.

For example, the following manufacturing method is preferable in making the above-described liquid crystal polyester. In the method described below, synthesis of a liquid crystal polyester prepared from p-hydroxybenzoic acid, 4,4'-dihydroxybiphenyl, hydroquinone, terephthalic acid, and isophthalic acid is given as an example. The copolymer components are not limited these. Each component can be replaced with other hydroxycarboxylic acid, an aromatic diol, or an aromatic dicarboxylic acid to form the resin according to the method described below.

Predetermined amounts of p-hydroxybenzoic acid, 4,4'-dihydroxybiphenyl, hydroquinone, terephthalic acid, isophthalic acid, and acetic anhydride (1.03 to 1.09 molar equivalents to the hydroxyl groups in the liquid crystal resin material) are charged in a reactor equipped with a stirring blade, a fractionating column, a reflux duct, and a discharge port located at the bottom. The mixture is stirred in a nitrogen gas atmosphere under heating and acetylation of the hydroxyl groups is performed for 2.1 to 2.9 hours at 140° C. to 150° C. under reflux, followed by switching to the reflux duct to terminate the acetylation step. Subsequently, the resulting mixture is heated to the melting point of the liquid crystal polyester +5-40° C. over 2.5 to 6.5 hours while distilling away the acetic acid, followed by 0.2 to 1.5 hours of stirring under heating. The pressure was then reduced to 665 Pa or less over 0.5 to 2 hours, and the polycondensation is performed for about 3 hours. The reaction is then terminated.

The acetylation and the polycondensation may be performed consecutively in the same reactor or may be performed in different reactors.

In the step of polycondensation, the degree of vacuum is preferably 133 Pa or less. The final polymerization temperature is preferably about the melting point +20° C. and less than 360° C. The stirring rate is preferably 50 rpm or less.

The polymerization time from the point at which the degree of vacuum is reduced to 665 Pa or less to the point at which the polymerization is terminated by detecting a predetermined torque is more preferably 0.5 to 1 hour.

Upon completion of the polymerization, in order to discharge the resulting polymer from the reactor, the interior of the reactor is pressurized to, for example, about 0.02 to 0.5

MPa at a temperature at which the polymer melts, thereby discharging the molten polymer in the form of strands from the discharge port formed at the bottom of the reactor. The strands may be cooled with water and cut into pellets to obtain resin pellets. Melt polymerization is advantageous since homogeneous polymer can be produced. Melt polymerization is thus preferred since high-quality polymer that generates smaller amounts of gas can be produced.

In making the liquid crystal resin of the present invention, it is possible to terminate the polycondensation reaction by solid-phase polymerization. For example, the polymer or the oligomer of the liquid crystal resin of the present invention may be pulverized with a disintegrator, and the resulting pulverized material may be heated at a temperature ranging from the melting point of the liquid crystal resin −5° C. to the melting point of the liquid crystal resin −50° C. for 1 to 50 hours in nitrogen flow or under reduced pressure so as to perform polycondensation until a predetermined degree of polymerization is reached, followed by the termination of the reaction. The solid-phase polymerization is advantageous for synthesizing a polymer having a high degree of polymerization.

The polycondensation reaction for the liquid crystal resin proceeds in the absence of any catalyst. Alternatively, a metal compound, such as stannous acetate, tetrabutyl titanate, potassium acetate, sodium acetate, antimony trioxide, or metallic magnesium, may be used in addition.

The number-average molecular weight of the liquid crystal resin of the present invention is preferably 3,000 to 25,000, more preferably 5,000 to 20,000, and more preferably 8,000 to 18,000.

The number-average molecular weight can be determined by gel permeation chromatography-light scattering (GPC-LS) analysis in the presence of a solvent that can dissolve the liquid crystal resin.

In a liquid crystal resin prepared by polycondensation by deacetylation, the terminal acetyl groups can be converted to hydroxyl groups by hydrolysis, such as addition of water. In such an event, many terminal hydroxyl groups of the liquid crystal resin are hydroxyl groups derived from hydroxy carboxylic acid; moreover, the molecular weight is decreased and oligomers are generated, which is problematic. Thus, when terminal groups are hydroxyl groups derived from an aromatic hydroxy carboxylic acid, thermal stability and oxidation resistance are low, and carbon dioxide gas and phenol gas are generated by elimination and pyrolysis of the aromatic hydroxy carboxylic acid, which is problematic.

In the present invention, it is possible to further add a filler to impart mechanical strength and other properties to the liquid crystal resin. The filler is not particular limited, and a fibrous, lamellar, powdery, or granular resin may be used. Specific examples thereof include fibrous or whisker-like fillers such as glass fibers, PAN or pitch-type carbon fibers, stainless steel fibers, metal fibers such as aluminum-fibers and brass fibers, organic fibers such as aromatic polyamide fibers and liquid crystal polyester fibers, gypsum fibers, ceramic fibers, asbestos fibers, zirconia fibers, alumina fibers, silica fibers, titanium oxide fibers, silicon carbide fibers, rock wool, potassium titanate whiskers, barium titanate whiskers, aluminum borate whiskers, and silicon nitride whiskers; and powdery, granular, or lamellar fillers such as mica, talc, kaolin, silica, glass beads, glass flakes, glass micro balloons, clays, molybdenum disulfide, wollastonite, titanium oxide, zinc oxide, calcium polyphosphorate, and graphite. The above-described fillers usable in the present invention may be subjected to surface treatment with known coupling agents, e.g., silane coupling agents or titanate coupling agents, or other surface-treating agents prior to use.

Among these fillers, use of glass fibers is preferred because it provides a good balance between availability and mechanical strength. The type of the glass fibers that can be used for reinforcement of resins is not particularly limited. For example, any of long fibers, short fiber-type chopped strands, milled fibers, and the like may be selected and used. Two or more or these may be used in combination. As the glass fibers used in the present invention, alkalescent glass fibers having excellent mechanical strength are preferable. Glass fibers are preferably treated with a coating agent or binder of an epoxy, urethane, or acryl type, or the like. Epoxy binders are particularly preferable. The fibers are preferably treated with coupling agents of a silane or titanate type or by other surface-treating agents. Epoxysilane or aminosilane coupling agents are particularly preferable.

The glass fibers may be coated with or bound by a thermoplastic resin, such as an ethylene/vinyl acetate copolymer, or a thermosetting resin, such as an epoxy resin.

The amount of the filler blended is preferably 30 to 200 parts by weight and more preferably 40 to 150 parts by weight relative to 100 parts by weight of the liquid crystal polyester.

To the liquid crystal resin of the present invention, typical additives may be added or a polymer other than thermoplastic resins may be blended to impart desired characteristics. Examples of the additives include antioxidants and heat stabilizers (e.g., hindered phenol, hydroquinone, phosphites, substitution products thereof, and the like), UV absorbers (e.g., resorcinol and salicilate), coloring inhibitors such as phosphite and hypophosphite, lubricants and mold releasing agents (montanic acid and its metal salts, its esters, its half-esters, stearyl alcohol, stearamide, polyethylene wax, and the like), coloring agents containing dyes and pigments, carbon blacks serving as conducting agents or coloring agents, crystal nucleating agents, plasticizers, flame retardants (bromine flame retardants, phosphorus flame retardants, red phosphorus flame retardants, and silicone flame retardants), flame retardant auxiliaries, and antistatic agents.

These additives are preferably blended with the resin by melt kneading. Any conventional melt kneading process may be employed. For example, using a Banbury mixer, rubber rollers, a kneader, or a single or twin shaft extruder, the additives are melt-kneaded with the resin at 180 to 350° C., more preferably 250 to 320° C. to prepare a liquid crystal resin composition. Here, any of the methods below may be used: 1) a batch kneading process in which a liquid crystal resin is blended with optional components, i.e., fillers and other additives, in a single step; 2) a master pellet process in which a liquid crystal resin composition (master pellets) in which high concentrations of additives are contained in a liquid crystal polyester and then adding other thermoplastic resins, fillers, and other additives so that predetermined concentration are reached; and 3) a fractional addition process in which a liquid crystal resin and part of the other additives are first kneaded and then the remaining filler and the additives are added to the resulting mixture.

The liquid crystal resin of the present invention and the liquid crystal resin composition containing this resin generate reduced amounts of gas. They can be processed into three-dimensional articles, sheets, containers, pipes, films and the like having excellent surface appearance (color), mechanical properties, heat resistance, and flame retardancy by typical injection molding, extrusion molding, press molding, and the like. In particular, since the resin and the resin composition have high flowability and generate reduced amounts of gas, they are particularly useful in electric and electronic components prepared by injection molding.

The liquid crystal resin of the present invention and the liquid crystal resin composition containing this resin significantly improve the productivity of precision molded articles since bulging rarely occurs.

Moreover, the liquid crystal resin of the present invention and the liquid crystal resin composition containing this resin have low curing rate and are highly homogeneous. Thus, they can be easily worked into films having minimized thickness variation.

The process of working into films is preferably a T-die process so that the feature of minimized thickness variation can be fully exhibited. For example, in a T-die having a plurality of manifolds, each passage of which is tapered in the film discharge direction and becomes narrower as the length of the passage is increased, liquid crystal resins having different orientation angles are fed through the manifolds and vertically stacked on one another to form a single flow at the ends of the passages. The resulting flow of the combined liquid crystal resins is discharged from a lip to obtain a multilayer film including layers of different orientations inside. The obtained film exhibits excellent mechanical properties and dimensional stabilities in all directions.

In order to control the orientation, the film is preferably rolled to a thickness of 85% or less of the aperture of the lip using rollers controlled at the same temperature as that of the T-die.

The lip aperture is preferably 0.3 mm or less, more preferably 0.2 mm or less, and, from the standpoint of thickness variation, most preferably 0.1 mm or less.

The liquid crystal resin and the liquid crystal resin composition containing this resin, the liquid crystals are adequately and loosely packed. Thus, they can be processed into fibers with remarkably high strength without performing solid-phase polymerization.

Preferably, in the differential calorific measurement conducted on the resulting liquid crystal resin fibers, the melt heat $\Delta Hm_1$ at the endothermic peak $Tm_1$ observed when the fibers are heated from room temperature at a heating rate of 20° C./min is less than three times and more preferably less than twice the melt heat $Hm_2$ at the endothermic peak $Tm_2$ measured through the following steps: retaining the fibers at a temperature of $Tm_1$ +20° C. for 5 minutes after detecting $Tm_1$, cooling the fibers to room temperature at a cooling rate of 20° C./min, and heating the fibers again at a heating rate of 20° C./min during which the endothermic temperature $Tm_2$ is observed. Such a result shows that this fiber is not subjected to solid-phase polymerization.

The strength of the resulting liquid crystal resin fibers is preferably 12 cN/dtex or more.

In order to produce such fibers, a process of melt-spinning the liquid crystal resin using nozzles having tapered portions continuously narrowing toward the spinning holes, the tapered portions occupying at least 80% of the entire nozzle hole length in the range of 10 to 20 mm, is preferred over conventional spinning processes.

The nozzle may be a single component or may be constituted from a plurality of parts. The nozzle may be integrated with other components. Here, the lead-in hole upstream of the tapered portion and the spinning hole downstream of the tapered portion are regarded as nozzles. When the lead-in hole and/or the spinning hole has a straight portion, the sum of the lengths of the straight portions of the lead-in hole and/or the spinning hole and the tapered portion is regarded as the entire nozzle length, and no other part is considered as the nozzle.

More preferably, the length of the tapered portion is 85% or more and more preferably 90% or more of the entire length of the nozzle hole. A nozzle constituted from a continuously tapered portion starting from the lead-in hole and ending at the spinning hole is most preferable.

Moreover, the entire length of the nozzle hole is preferably 10 to 15 mm and more preferably 10 to 12 mm.

When such a long, gentle taper is used, a pressure in the fiber cross-sectional direction can be uniformly and continuously applied. As a result, the molecular chains of the liquid crystal resin of the present invention previously disordered realign (packing of the liquid crystal resin) in a well-ordered manner by melt spinning. Consequently, highly homogeneous fibers exhibiting low variation in fineness and fiber strength and achieving high strength can be produced.

When a nozzle having such a tapered portion is used in spinning of the liquid crystal resin of the present invention, the fiber strength is enhanced to 1.5 times or more compared with fibers spun using a typical straight nozzle. Such an increase in strength depends on the cone angle or the length of the tapered portion; however, the strength is more preferably 1.7 times or more and most preferably twice or more.

Here, "melt spinning" refers to a process of producing filaments by feeding a thermoplastic liquid crystal resin melted at a temperature over the melting point of the resin through a nozzle.

Unlike solution spinning in which a liquid crystal resin is dissolved in a solvent the resulting resin solution is sent through a nozzle to form filaments, followed by solvent extraction by drying, the process of melt spinning is remarkably simple because no secondary substance, such as solvent, is used. Moreover, since fibers produced by melt spinning do not require drying, the interior of the fiber is free from defects, such as voids, caused by evaporation of the solvent. Thus, high-quality fibers can be obtained.

In melt spinning, the strength of fibers of a noncrystalline thermoplastic resin can be enhanced by stretching through increasing the draft ratio, i.e., the winding rate to the rate of discharge from the spinning hole. However, in melt spinning of a thermoplastic liquid crystal resin, the strength does not significantly increase by increasing the draft ratio. This is because, the molecules of the liquid crystal resin are already aligned once they enter the lead-in hole and do not require stretching.

In the present invention, liquid crystal resin fibers spun using the above-described liquid crystal resin and the above-described particular nozzle show remarkably high strength without adjusting the draft ratio or performing heat treatment or solid-phase polymerization. Moreover, since the liquid crystals are already highly packed, the strength will not improve greatly by heat treatment or solid-phase polymerization. It is possible to perform heat treatment or solid-phase polymerization if desired; however, in general, practically sufficient strength can be obtained without heat treatment or solid-phase polymerization.

If the cone angle is excessively acute, packing of the liquid crystals of the liquid crystal resin fibers is inhibited, and the main stream for spinning will be generated in the central portion of the taper, thereby generating detention portions near the outer walls of the taper. The cone angle is preferably 1 to 20°, more preferably 2 to 15°, and most preferably 2.5 to 10°.

The cone angle is determined from the diameters of the lead-in hole of the spinning nozzle and the spinning hole from which the resin is discharged and the length of the taper in the nozzle length direction. The diameter of the lead-in hole is preferably 0.5 to 3 mm, more preferably 0.8 to 2.5 mm, and most preferably 1.0 to 2.0 mm. The diameter of the spinning hole is preferably 0.1 to 0.5 mm, more preferably 0.12 to 0.3 mm, and most preferably 0.13 to 0.25 mm. As for the structure of the nozzle, the nozzle may have one hole for a single filament or a plurality of holes for multifilament. When a plurality of holes is provided in one nozzle, the outline and the dimensions of all the holes may be the same. Alternatively, some or all of the holes may have different outline and/or dimensions so that the discharge balance can be adjusted.

Figure 1:
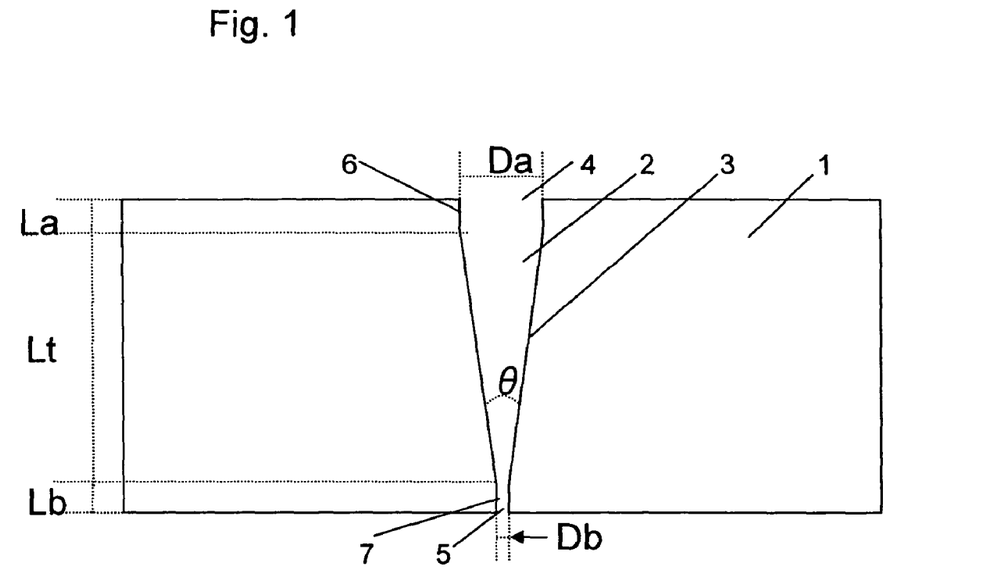
FIG. 1 is a cross-sectional view of a nozzle according to a preferred embodiment of the present invention.

A preferable structure of a nozzle will now be illustrated with reference to FIG. 1. Note that the structure is not limited to this. FIG. 1 is a cross-sectional view of a nozzle according to a preferred embodiment of the present invention. A nozzle 1 has a nozzle hole 2 having a taper 3. A lead-in hole 4 is provided at one end. A first straight portion 6 at the lead-in hole side a second straight portion 7 at the spinning hole side, and a spinning hole 5 are consecutively provided. La, Lt, Lb respectively denote the length of the first straight portion at the lead-in hole side, the length of the taper, and the length of the second straight portion at the spinning hole side. Da and Db respectively denote the diameter of the lead-in hole and the diameter of the spinning hole; and θ denotes the cone angle. In FIG. 1, (La+Lb+Lt) denotes the entire length of the nozzle hole, and Lt denotes the length of the taper. For example, when (La+Lb+Lt) is 10 mm and the taper is 9.9 mm long, the length of the taper is 99% of the entire nozzle length (Lt/(La+Lb+Lt)×100). When the diameter Da of the lead-in hole is 1.5 mm, the diameter Db of the spinning hole is 0.15 mm, the straight portion at the lead-in hole side has a length of 0.09 mm and a diameter of 1.5 mm, and the straight portion at the spinning hole side has a length of 0.01 mm and a diameter of 0.15 mm, a nozzle with a cone angle of 7.7° can be obtained.

Here, La represents the length of the straight portion at the lead-in hole side and may be zero. Lb represents the length of the straight portion at the spinning hole side and may be zero.

The straight portions are present due to the working limit. The straight portions are preferably as small as possible. When straight portions are to be formed, the length of the first straight portion at the lead-in hole side is preferably 2 mm or less, more preferably 1 mm or less, and most preferably 0.5 mm or less in the longitudinal direction of the nozzle. The length of the second straight portion at the spinning hole side is preferably 0.06 mm or less and more preferably 0.03 mm or less.

The nozzle of the present invention must have at least one taper preferably continuously occupying 80% of the entire nozzle length. However, from the standpoint of improving the accuracy of processing, the taper may not be completely continuous and may have a very short straight portion in the taper.

The number of straight portions is preferably two or less, more preferably 1 or less, and most preferably zero.

The length of the straight portion in the taper is preferably 0.05 mm per location and more preferably 0.01 mm per location.

In the present invention, the length of the straight portion in the taper is counted in the length of the taper.

In spinning the liquid crystal resin of the present invention, the temperature is preferably the melting point of the liquid crystal resin +15° C. or more, more preferably the melting point +40° C. or more, and most preferably in the range of the melting point +20° C. to +30° C.

Here, "temperature" refers to all temperatures detected at an extruder or pressure-melting device used for plasticization, all devices from the filter to a sandpack and a nozzle and piping therefor, and the nozzle.

When the liquid crystal resin is processed in such a temperature range, sufficient plasticization and homogeneity can be achieved, and good liquid crystallinity can be yielded in a molten state. Thus, the packing effect of liquid crystals yielded by the taper nozzle of the present invention can be increased.

The liquid crystal resin of the present invention exhibits high strength without increasing the draft ratio during the spinning. However, since there is a working limit on the diameter of the spinning nozzle, the draft ratio is preferably adjusted to 1 to 50, more preferably 2 to 35, and most preferably 3 to 15 to obtain finer fibers.

In this manner, in the differential calorific measurement conducted on the resulting liquid crystal resin fibers, the melt heat $\Delta Hm_1$ at the endothermic peak $Tm_1$ observed when the fibers are heated from room temperature at a heating rate of 20° C./min is less than three times the melt heat $Hm_2$ at the endothermic peak $Tm_2$ measured through the following steps: retaining the fibers at a temperature of $Tm_1$ +20° C. for 5 minutes after detecting $Tm_1$, cooling the fibers to room temperature at a cooling rate of 20° C./min, and heating the fibers again at a heating rate of 20° C./min during which the endothermic temperature $Tm_2$ is observed. Moreover, the resulting liquid crystal resin fibers have a strength of 12 cN/dtex or more.

$\Delta Hm_1$ of the liquid crystal resin fibers significantly increases by conducting heat treatment or solid-phase polymerization after the melt spinning, thereby resulting in low recyclability.

$\Delta Hm_2$ of the liquid crystal resin fibers remains substantially the same as $\Delta Hm_2$ of the liquid crystal resin before the spinning. This value is characteristic of the constitution of the liquid crystal resin.

When $\Delta Hm_1$ of the fibers is less than three times $\Delta Hm_2$, the fibers has not been subjected to heat treatment or solid-phase polymerization that would greatly change $\Delta Hm_1$. Thus, the fibers are easy to recycle. Preferably, $\Delta Hm_1$ of the fibers is less than twice $\Delta Hm_2$, and more preferably less than 1.5 times $\Delta Hm_2$. The lower limit is preferably 0.1 times $\Delta Hm_2$.

In the present invention, the liquid crystal resin fibers having the above-described melt heat are not subjected to heat treatment that would greatly change $\Delta Hm_1$ after the spinning. Since neither heat treatment nor solid-phase polymerization is conducted, an increase in crystallinity or melting point, which would result from side reaction of heat treatment or solid-phase polymerization, does not occur. Thus, the liquid crystal resin fibers can be recycled at a temperature less than a typical temperature for working the liquid crystal resin, i.e., the melting point +20° C.

The fiber strength of the liquid crystal resin fibers of the present invention is more preferably 14 cN/dtex or more and most preferably 16 cN/dtex or more. The upper limit that is suitable for practical use is 25 cN/dtex or less. In the ranges above, fibers having high strength not achievable with other conventional thermoplastic resin fibers can be obtained. Here, the strength of the fibers refers to the single-yarn strength.

The fiber strength can be measured, for example, according to Japanese Industrial Standards L 1013 using Tensilon UCT-100 produced by Orientec Co., Ltd.

The liquid crystal resin and the liquid crystal resin composition containing this resin according to the present invention can be used in the following applications: electric and electronic components such as various gears, various cases, sensors, LED lamps, connectors, sockets, resistors, relay casings, switches, coil bobbins, variable condenser casings, optical pick-ups, oscillators, various terminal boards, transformers, plugs, printed wiring boards, tuners, speakers, microphones, headphones, miniature motors, magnetic head bases, power modules, housings, semiconductors, liquid crystal display components, FDD carriage, FDD chassis, HDD components, motor brush holders, parabolic antenna, and computer-related components; components for home and office electric devices, such as VCR components, television components, irons, hair driers, rice cooker components, microwave oven components, acoustic goods, audio components such as audio equipment, laser disks, and compact disks, lighting equipment, refrigerator components, air conditioner components, typewriter components, and word-processor components; mechanical components such as components for office computers, telephones, fax machines, and copying machines, jigs for washing, various bearings such as oil-less bearings, stern bearings, and submerged bearings, motor components, lighters, and typewriters; optical devices such as microscopes, binocular telescopes, cameras, and watches; components for automobiles and vehicles, such as alternator terminals, alternator connectors; IC regulators, potentiometer bases for light dimmers, various valves such as exhaust gas valves, various pipes for fuel systems, exhaust systems, and inlet systems, air intake nozzle snorkels, intake manifolds, fuel pumps, joints for engine cooling water, carburetor main bodies, carburetor spacers, exhaust gas sensors, cooling water sensors, oil temperature, throttle position sensors, crankshaft position sensors, air flow meters, sensors for detecting wears of brake pads, thermostat bases for air conditioners, motor insulators for air conditioners, separators, heater hot air flow control valves, brush holders for radiator motors, water pump impellers, turbine vanes, components for wiper motors, distributors, starter switches, starter relays, wire harnesses for transmissions, window washer nozzles, air conditioner panel switch substrates, coils for electromagnetic valves of fuel systems, connectors for fuses, horn terminals, insulating boards for electrical components, step motor rotors, lamp sockets, lamp reflectors, lamp housings, brake pistons, solenoidal bobbins, engine-oil filters, and igniter casings.

The film of the present invention is useful as films for magnetic recording media, photographic films, films for capacitors, films for electrical isolation, packaging films, drafting films, ribbon films, sheet applications such as automobile interior ceilings, door trims, pads for instrument panels, buffers for bumpers and side frames, noise absorbing pads for the back of bonnets and the like, seating materials, pillars, fuel tanks, brake hoses, nozzles for window washing liquids, tubes for refrigerants of air conditioners, and peripheral components of these.

The fibers of the present invention is useful in screen cloths, computer ribbons, cloths for print circuit boards, air bags, air ships, foundation cloths for domes and the like, rider suits, fishlines, various lines (for yachts, paragliders, air balloons, and kite strings), alternative chain yarn for PET, blind codes, support codes for screen doors, various codes for interiors of automobiles and air planes, and force transmission codes for electric products and robots.

EXAMPLES

The present invention will now be described in further details by way of examples. The scope of the present invention is not limited to the examples below.

Example 1

In a 5 L reactor equipped with a stirring blade and a reflux duct, 932 parts by weight of p-hydroxybenzoic acid, 293 parts by weight of 4,4'-dihydroxybiphenyl, 74 parts by weight of hydroquinone, 344 parts by weight of terephthalic acid, 30 parts by weight of isophthalic acid, and 1240 parts by weight (1.08 equivalents of the total of the phenolic hydroxyl groups) of acetic anhydride were charged. The resulting mixture was subjected to reaction at 145° C. for 2.5 hours in nitrogen gas atmosphere with stirring. Upon termination of the acetylation, the resulting mixture was heated to 360° C. over 4 hours. Subsequently, the polymerization temperature was retained at 360° C., and stirring was conducted for 1 hour under heating. The pressure was then reduced to 133 Pa in 1.0 hour, and the reaction was further continued for 50 minutes. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-1) had 60 mol % of a structural unit (structural unit (I)) derived from p-hydroxybenzoic acid, 14 mol % of a structural unit (structural unit (II)) derived from 4,4'-dihydroxybiphenyl, 6 mol % of a structural unit (structural unit (III)) derived from hydroquinone, 18.4 mol % of a structural unit (structural unit (IV)) derived from terephthalic acid, and 1.6 mol % of a structural unit (structural unit (V)) derived from isophthalic acid. The ratio between the structural units derived from two aromatic diols, i.e., 4,4'-dihydroxybiphenyl and hydroquinone, was 70:30 (structural unit (II):structural unit (III)). The content of the structural unit (I) relative to the total of the structural units (I), (II), and (III) was 75 mol %. The content of the structural unit (IV) relative to the total of the structural units (IV) and (V) was 92 mol %. The total of the structural units (II) and (III) was equimolar to the total of the structural units (IV) and (V).

The melting point of this liquid crystal resin was 348° C., $\Delta S$ was $0.6 \times 10^{-3}$ J/g·K, and the melt viscosity measured at 360° C. and a shear rate of 1,000/s using a Koka-type flow tester was 20 Pa·s.

The melting point (Tm) refers to an endothermic temperature $Tm_2$ observed according to the following differential calorific measurement process: after an endothermic peak temperature $Tm_1$ is observed by heating a synthesized polymer from room temperature at a heating rate of 20° C./min, the polymer is retained at a temperature of $Tm_1$ +20° C. for 5 minutes, cooled to room temperature at a cooling rate of 20° C./min, and heated again at a heating rate of 20° C./min during which the endothermic temperature $Tm_2$ is observed. This definition is common to all examples below.

The following items (1) to (5) were examined. The results are shown in Table 1.

(1) Residual Amount of Monoacetyl Derivative of Aromatic Diol

Trace amounts of the material was sampled upon completion of the acetylation, and the sample was subjected to preparative gas chromatography. The resulting sample was subjected to $^1$H-NMR analysis at 400 MHz in a heavy acetone solvent to determine the residual amount of the monoacetyl derivative of each aromatic diol according to the equation below:

Residual amount of monoacetyl derivative (%)=[$Ia/(Ia+Ib)$]×100 wherein Ia represents the peak intensity assigned to the hydrogen atom bonded to the α carbon of the aromatic carbons bonded to the unacetylated hydroxyl group of the monoacetyl derivative of the aromatic diol, and Ib represents the peak intensity assigned to the hydrogen atom bonded to the α carbon of the aromatic carbons bonded to the acetyl group of the monoacetyl and diacetyl derivatives of the aromatic diol.

(2) Amounts of Gas Generated

A sample (150 mg) was dried at 150° C. for 5 hours in advance and generation of gas was examined with a simultaneous tester combining TG40M and GC/MS QP5050A produced by Shimadzu Corporation. The sample was retained at the melting point +10° C. for 30 minutes in a helium atmosphere. For a liquid crystal resin having a melting point of 325° C. or less, the sample thereof was retained at 335° C. While performing TG-MS measurement, the generated gas was trapped using an adsorbent. The adsorbent was reheated in a thermodesorption equipment (280° C., adsorbent: C300) to conduct GC-MS measurement (column: PTEM-5). The gas species was determined from the mass number measured by GC-MS. The amounts of acetic acid gas, phenol gas, and carbon dioxide gas were calculated from the total heating loss and the peak intensities.

(3) Bulging

Using a twin-shaft extruder TEX30 produced by Japan steel Works, Ltd., 100 parts by weight of liquid crystal resin was fed from a hopper and 40 parts by weight of glass fibers (03T-790G produced by Nippon Electric Glass Co., Ltd.) were fed from the side. The temperature setting of the cylinder heater was adjusted so that the resin temperature was the melting point +10° C. The resin was melt-kneaded at a screw rotation speed of 100 rpm and was formed into pellets. The resulting pellets were dried by hot air and subjected to the following examinations.

The liquid crystal resin composition pellets were fed to injection molding machine Fanuc 30α-C, and extrusion was conducted at a cylinder temperature of the melting point +10° C. to prepare a rod-shaped molded article having a length of 150 mm, a width of 12.7 mm, and a thickness of 1 mm. The article was subjected to heat and humidity treatment at 120 RH % and 95° C. for 8 hours and heated at 275° C. for 10 minutes in a reflow bath. The number of articles that underwent bulging was determined among 1,000 articles.

(4) Metal Corrosion Test

The molded article prepared in (3) and a 2 cm×2 cm iron plate having a thickness of 2 mm were placed in a glass petri dish, covered with a lid, and heated for 200 hours in an oven at 150° C. The change in color and the corrosion of the iron plate were visually observed and evaluated as follows:
A: neither color change nor corrosion was observed
B: color change was observed but no corrosion was observed
C: both color change and corrosion were observed (5) Glass Clouding Test The molded article was placed in a glass petri dish as in (4), covered with a lid, and left to stand still on a hot plate at 270° C. The time taken for clouding of the upper lid of the glass petri dish to occur was determined (the maximum time was set to 50 hours).

The same testing was also conducted on the examples below.

Example 2

In a 5 L reactor equipped with a stirring blade and a reflux duct, 870 parts by weight of p-hydroxybenzoic acid, 1352 parts by weight of 4,4'-dihydroxybipheny, 89 parts by weight of hydroquinone, 374 parts by weight of terephthalic acid, 97 parts by weight of 2,6-naphthalenedicarboxylic acid, and 1191 parts by weight (1.08 equivalents of the total of the phenolic hydroxyl groups) of acetic anhydride were charged.

The resulting mixture was subjected to reaction at 145° C. for 2.5 hours in nitrogen gas atmosphere with stirring. Upon termination of the acetylation, the resulting mixture was heated to 350° C. over 4 hours. Subsequently, the polymerization temperature was retained at 350° C., and stirring was conducted for 1 hour under heating. The pressure was then reduced to 133 Pa in 1.0 hour, and the reaction was further continued for 42 minutes. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-2) had 54 mol % of a structural unit (structural unit (I)) derived from p-hydroxybenzoic acid, 16.1 mol % of a structural unit (structural unit (II)) derived from 4,4'-dihydroxybiphenyl, 6.9 mol % of a structural unit (structural unit (III)) derived from hydroquinone, 19.2 mol % of a structural unit (structural unit (IV)) derived from terephthalic acid, and 3.8 mol % of a structural unit (structural unit (V')) derived from 2,6-naphthalenedicarboxylic acid. The ratio between the structural units derived from two aromatic diols, i.e., 4,4'-dihydroxybiphenyl and hydroquinone, was 70:30 (structural unit (II):structural unit (III)). The content of the structural unit (I) relative to the total of the structural units (I), (II), and (III) was 70 mol %. The content of the structural unit (IV) relative to the total of the structural units (IV) and (V') was 83 mol %. The total of the structural units (II) and (III) was equimolar to the total of the structural units (IV) and (V).

The melting point of this liquid crystal resin was 335° C., ΔS was $0.5 \times 10^{-3}$ J/g·K, and the melt viscosity measured at 345° C. and a shear rate of 1,000/s using a Koka-type flow tester was 22 Pa·s.

Example 3

In a 5 L reactor equipped with a stirring blade and a reflux duct, 994 parts by weight of p-hydroxybenzoic acid, 298 parts by weight of 4,4'-dihydroxybiphenyl, 32 parts by weight of 2,6-dihydroxynaphthalene, 194 parts by weight of terephthalic acid, 105 parts by weight of isophthalic acid, and 1158 parts by weight (1.09 equivalents of the total of the phenolic hydroxyl groups) of acetic anhydride were charged. The resulting mixture was subjected to reaction at 145° C. for 2.5 hours in nitrogen gas atmosphere with stirring. Upon termination of the acetylation, the resulting mixture was heated to 370° C. over 4 hours. Subsequently, the polymerization temperature was retained at 370° C., and stirring was conducted for 1 hour under heating. The pressure was then reduced to 133 Pa in 1.0 hour, and the reaction was further continued for 22 minutes. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-3) had 66.8 mol % of a structural unit (structural unit (I)) derived from p-hydroxybenzoic acid, 14.8 mol % of a structural unit (structural unit (II)) derived from 4,4'-dihydroxybiphenyl, 1.8 mol % of a structural unit (structural unit (III)') derived from 2,6-dihydroxynaphthalene, 10.8 mol % of a structural unit (structural unit (IV)) derived from terephthalic acid, and 5.8 mol % of a structural unit (structural unit (V)) derived from isophthalic acid. The ratio between the structural units derived from the two aromatic diols, i.e., 4,4'-dihydroxybiphenyl and 2,6-dihydroxynaphthalene, was 89:11 (structural unit (II):structural unit (III)'). The content of the structural unit (I) relative to the total of the structural units (I), (II), and (III) was 80 mol %. The content of the structural unit (IV) relative to the total of the structural units (IV) and (V) was 65 mol %. The total of the structural units (II) and (III) was equimolar to the total of the structural units (IV) and (V).

The melting point of this liquid crystal resin was 355° C., $\Delta S$ was $0.4 \times 10^{-3}$ J/g·K, and the melt viscosity measured at 365° C. and a shear rate of 1,000/s using a Koka-type flow tester was 24 Pa·s.

Example 4

In a 5 L reactor equipped with a stirring blade and a reflux duct, 870 parts by weight of p-hydroxybenzoic acid, 1327 parts by weight of 4,4'-dihydroxybipheny, 104 parts by weight of hydroquinone, 292 parts by weight of terephthalic acid, 156 parts by weight of isophthalic acid, and 1254 parts by weight (1.05 equivalents of the total of the phenolic hydroxyl groups) of acetic anhydride were charged. The resulting mixture was subjected to reaction at 148° C. for 2.5 hours in nitrogen gas atmosphere with stirring. Upon termination of the acetylation, the resulting mixture was heated to 330° C. over 4 hours. Subsequently, the polymerization temperature was retained at 330° C., and stirring was conducted for 1 hour under heating. The pressure was then reduced to 133 Pa in 1.0 hour, and the reaction was further continued for 60 minutes. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-4) had 53.8 mol % of a structural unit (structural unit (I)) derived from p-hydroxybenzoic acid, 15 mol % of a structural unit (structural unit (II)) derived from 4,4'-dihydroxybiphenyl, 8.1 mol % of a structural unit (structural unit (III)) derived from hydroquinone, 15 mol % of a structural unit (structural unit (IV)) derived from terephthalic acid, and 8.1 mol % of structural unit (structural unit (V)) derived from isophthalic acid. The ratio between the structural units derived from the two aromatic diols, i.e., 4,4'-dihydroxybiphenyl and hydroquinone, was 65:35 (structural unit (II):structural unit (III)). The content of the structural unit (I) relative to the total of the structural units (I), (II), and (III) was 70 mol %. The content of the structural unit (IV) relative to the total of the structural units (IV) and (V) was 65 mol %. The total of the structural units (II) and (III) was equimolar to the total of the structural units (IV) and (V).

The melting point of this liquid crystal resin was 310° C., $\Delta S$ was $0.3 \times 10^{-3}$ J/g·K, and the melt viscosity measured at 320° C. and a shear rate of 1,000/s using a Koka-type flow tester was 20 Pa·s.

Example 5

To 100 parts by weight of the liquid crystal resin (A-1) prepared in EXAMPLE 1, 50 parts by weight of glass fibers (ECS03T-747H produced by Asahi Electric Glass Co., Ltd) were added. The resulting mixture was kneaded in a twin-shaft extruder at 350° C. and pelletized. In examining the amounts of gas, a sample of the resin composition was measured; accordingly, in order to determine the amount of gas generated from the liquid crystal resin only, the observed amounts of generated gas were multiplied by 3/2.

Comparative Example 1

Polymerization was conducted as in EXAMPLE 1 except that the amount of the acetic anhydride was changed to 1377 g (1.199 equivalents of the total of the phenolic hydroxyl groups) and the acetylation was conducted at 170° C. for 45 minutes.

The reaction was continued for 2 minutes at a final polymerization temperature of 360° C. and a vacuum of 133 Pa. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-5) had 60 mol % of a structural unit (structural unit (I)) derived from p-hydroxybenzoic acid, 14 mol % of a structural unit (structural unit (II)) derived from 4,4'-dihydroxybiphenyl, 6 mol % of a structural unit (structural unit (III)) derived from hydroquinone, 18.4 mol % of a structural unit (structural unit (IV)) derived from terephthalic acid, and 1.6 mol % of a structural unit (structural unit (V)) derived from isophthalic acid. The ratio between the structural units derived from the two aromatic diols, i.e., 4,4'-dihydroxybiphenyl and hydroquinone, was 70:30 (structural unit (II):structural unit (III)). The content of the structural unit (I) relative to the total of the structural units (I), (II), and (III) was 75 mol %. The content of the structural unit (IV) relative to the total of the structural units (IV) and (V) was 92 mol %. The total of the structural units (II) and (III) was equimolar to the total of the structural units (IV) and (V).

The melting point of this liquid crystal resin was 350° C., $\Delta S$ was $1.4 \times 10^{-3}$ J/g·K, and the melt viscosity measured at 360° C. and a shear rate of 1,000/s using a Koka-type flow tester was 21 Pa·s.

Comparative Example 2

Polymerization was conducted as in EXAMPLE 1 except that the amount of the acetic anhydride was changed to 1286 g (1.12 equivalents of the total of the phenolic hydroxyl groups) and the acetylation was conducted at 155° C. for 2 hours.

The reaction was continued for 2 minutes at a final polymerization temperature of 360° C. and a vacuum of 133 Pa. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-6) had 60 mol % of a structural unit (structural unit (I)) derived from p-hydroxybenzoic acid, 14 mol % of a structural unit (structural unit (II)) derived from 4,4'-dihydroxybiphenyl, 6 mol % of a structural unit (structural unit (III)) derived from hydroquinone, 18.4 mol % of a structural unit (structural unit (IV)) derived from terephthalic acid, and 1.6 mol % of a structural unit (structural unit (V)) derived from isophthalic acid. The ratio between the structural units derived from the two aromatic diols, i.e., 4,4'-dihydroxybiphenyl and hydroquinone, was 70:30 (structural unit (II):structural unit (III)). The content of the structural unit (I) relative to the total of the structural units (I), (II), and (III) was 75 mol %. The content of the structural unit (IV)

relative to the total of the structural units (IV) and (V) was 92 mol %. The total of the structural units (II) and (III) was equimolar to the total of the structural units (IV) and (V).

The melting point of this liquid crystal resin was 349° C., ΔS was $1.4 \times 10^{-3}$ J/g·K, and the melt viscosity measured at 359° C. and a shear rate of 1,000/s using a Koka-type flow tester was 21 Pa·s.

Comparative Example 3

Polymerization was conducted as in EXAMPLE 1 except that the amount of the acetic anhydride was changed to 1205 g (1.05 equivalents of the total of the phenolic hydroxyl groups) and the acetylation was conducted at 155° C. for 3 hours.

The reaction was continued for 2 minutes at a final polymerization temperature of 360° C. and a vacuum of 133 Pa. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-7) had 60 mol % of a structural unit (structural unit (I)) derived from p-hydroxybenzoic acid, 14 mol % of a structural unit (structural unit (II)) derived from 4,4'-dihydroxybiphenyl, 6 mol % of a structural unit (structural unit (III)) derived from hydroquinone, 18.4 mol % of a structural unit (structural unit (IV)) derived from terephthalic acid, and 1.6 mol % of a structural unit (structural unit (V)) derived from isophthalic acid. The ratio between the structural units derived from the two aromatic diols, i.e., 4,4'-dihydroxybiphenyl and hydroquinone, was 70:30 (structural unit (II):structural unit (III)). The content of the structural unit (I) relative to the total of the structural units (I), (II), and (III) was 75 mol %. The content of the structural unit (IV) relative to the total of the structural units (IV) and (V) was 92 mol %. The total of the structural units (II) and (III) was equimolar to the total of the structural units (IV) and (V).

The melting point of this liquid crystal resin was 349° C., ΔS was $1.4 \times 10^{-3}$ J/g·K, and the melt viscosity measured at 359° C. and a shear rate of 1,000/s using a Koka-type flow tester was 21 Pa·s.

Comparative Example 4

Polymerization was conducted as in EXAMPLE 1 except that the amount of the acetic anhydride was changed to 1263 g (1.10 equivalents of the total of the phenolic hydroxyl groups) and the acetylation was conducted at 140° C. for 3 hours.

The reaction was continued for 3 minutes at a final polymerization temperature of 360° C. and a vacuum of 133 Pa. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-8) had 60 mol % of a structural unit (structural unit (I)) derived from p-hydroxybenzoic acid, 14 mol % of a structural unit (structural unit (II)) derived from 4,4'-dihydroxybiphenyl, 6 mol % of a structural unit (structural unit (III)) derived from hydroquinone, 18.4 mol % of a structural unit (structural unit (IV)) derived from terephthalic acid, and 1.6 mol % of a structural unit (structural unit (V)) derived from isophthalic acid. The ratio between the structural units derived from the two aromatic diols, i.e., 4,4'-dihydroxybiphenyl and hydroquinone, was 70:30 (structural unit (II):structural unit (III)). The content of the structural unit (I) relative to the total of the structural units (I), (II), and (III) was 75 mol %. The content of the structural unit (IV) relative to the total of the structural units (IV) and (V) was 92 mol %. The total of the structural units (II) and (III) was equimolar to the total of the structural units (IV) and (V).

The melting point of this liquid crystal resin was 348° C., ΔS was $1.5 \times 10^{-3}$ J/g·K, and the melt viscosity measured at 349° C. and a shear rate of 1,000/s using a Koka-type flow tester was 22 Pa·s.

Comparative Example 5

Polymerization was conducted as in EXAMPLE 1 except that the amount of the acetic anhydride was changed to 1183 g (1.03 equivalents of the total of the phenolic hydroxyl groups) and the acetylation was conducted at 145° C. for 2 hours.

The reaction was continued for 121 minutes at a final polymerization temperature of 360° C. and a vacuum of 133 Pa. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-9) had 60 mol % of a structural unit (structural unit (I)) derived from p-hydroxybenzoic acid, 14 mol % of a structural unit (structural unit (II)) derived from 4,4'-dihydroxybiphenyl, 6 mol % of a structural unit (structural unit (III)) derived from hydroquinone, 18.4 mol % of a structural unit (structural unit (IV)) derived from terephthalic acid, and 1.6 mol % of a structural unit (structural unit (V)) derived from isophthalic acid. The ratio between the structural units derived from the two aromatic diols, i.e., 4,4'-dihydroxybiphenyl and hydroquinone, was 70:30 (structural unit (II):structural unit (III)). The content of the structural unit (I) relative to the total of the structural units (I), (II), and (III) was 75 mol %. The content of the structural unit (IV) relative to the total of the structural units (IV) and (V) was 92 mol %. The total of the structural units (II) and (III) was equimolar to the total of the structural units (IV) and (V).

The melting point of this liquid crystal resin was 345° C., ΔS was $1.4 \times 10^{-3}$ J/g·K, and the melt viscosity measured at 355° C. and a shear rate of 1,000/s using a Koka-type flow tester was 23 Pa·s.

Comparative Example 6

In a 5 L reactor equipped with a stirring blade and a reflux duct, 932 parts by weight of p-hydroxybenzoic acid, 419 parts by weight of 4,4'-dihydroxybiphenyl, 344 parts by weight of terephthalic acid, 30 parts by weight of isophthalic acid, and 1240 parts by weight (1.08 equivalents of the total of the phenolic hydroxyl groups) of acetic anhydride were charged. The resulting mixture was subjected to reaction at 145° C. for 2.5 hours in nitrogen gas atmosphere with stirring. Upon termination of the acetylation, the resulting mixture was heated to 360° C. over 4 hours. Subsequently, the polymerization temperature was retained at 360° C., and stirring was conducted for 1 hour under heating. The pressure was then reduced to 133 Pa in 1.0 hour, and the reaction was further continued for 12 minutes. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-10) had 60 mol % of a structural unit (structural unit (I)) derived from p-hydroxybenzoic acid, 20 mol % of a structural unit (structural unit (II)) derived from 4,4'-dihydroxybiphenyl, 15 mol % of a structural unit (structural unit (IV)) derived from terephthalic acid, and 5 mol % of a structural unit (structural unit (V)) derived from isophthalic acid. The melting point of this liquid crystal resin was 342° C., ΔS was $2.1 \times 10^{-3}$ J/g·K, and the melt viscosity measured at 352° C. and a shear rate of 1,000/s using a Koka-type flow tester was 25 Pa·s. The content of the structural unit (I) relative to the total of the structural units (I), (II), and (III) was 75 mol %. The content of the structural unit (IV) relative to the total of the structural units (IV) and (V) was 75 mol %. The total of the structural units (II) and (III) was equimolar to the total of the structural units (IV) and (V).

Comparative Example 7

Polymerization was conducted as in COMPARATIVE EXAMPLE 6 using the same components as EXAMPLE 1 except that the amount of the acetic anhydride was changed to 1183 g (1.03 equivalents of the total of the phenolic hydroxyl groups) and the acetylation was conducted at 145° C. for 2 hours.

The reaction was continued for 145 minutes at a final polymerization temperature of 360° C. and a vacuum of 133 Pa. The torque never reached 20 kgcm; thus, the polycondensation was discontinued.

Comparative Example 8

Polymerization was conducted as in EXAMPLE 2 using the same components as EXAMPLE 2 except that the acetylation was conducted at 155° C. for 2 hours.

The reaction was continued for 8 minutes at a final polymerization temperature of 350° C. and a vacuum of 133 Pa. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-12) had 54 mol % of a structural unit (structural unit (I)) derived from p-hydroxybenzoic acid, 16.1 mol % of a structural unit (structural unit (II)) derived from 4,4'-dihydroxybiphenyl, 6.9 mol % of a structural unit (structural unit (III)) derived from hydroquinone, 19.2 mol % of a structural unit (structural unit (IV)) derived from terephthalic acid, and 3.8 mol % of a structural unit (structural unit (V)') derived from 2,6-naphthalenedicarboxylic acid. The ratio between the structural units derived from the two aromatic diols, i.e., 4,4'-dihydroxybiphenyl and hydroquinone, was 70:30 (structural unit (V)'). The content of the structural unit (I) relative to the total of the structural units (I), (II), and (III) was 70 mol %. The content of the structural unit (IV) relative to the total of the structural units (IV) and (V)' was 83 mol %. The total of the structural units (II) and (III) was equimolar to the total of the structural units (IV) and (V).

The melting point of this liquid crystal resin was 335° C., ΔS was $1.2 \times 10^{-3}$ J/g·K, and the melt viscosity measured at 345° C. and a shear rate of 1,000/s using a Koka-type flow tester was 22 Pa·s.

Comparative Example 9

Polymerization was conducted as in EXAMPLE 4 using the same components as EXAMPLE 4 except that the acetylation was conducted at 170° C. for 1.5 hours.

The reaction was continued for 4 minutes at a final polymerization temperature of 330° C. and a vacuum of 133 Pa. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-13) had 53.8 mol % of a structural unit (structural unit (I)) derived from p-hydroxybenzoic acid, 15 mol % of a structural unit (structural unit (II)) derived from 4,4'-dihydroxybiphenyl, 8.1 mol % of a structural unit (structural unit (III)) derived from hydroquinone, 15 mol % of a structural unit (structural unit (IV)) derived from terephthalic acid, and 8.1 mol % of a structural unit (structural unit (V)) derived from isophthalic acid. The ratio between the structural units derived from the two aromatic diols, i.e., 4,4'-dihydroxybiphenyl and hydroquinone, was 65:35 (structural unit (II):structural unit (III)). The content of the structural unit (I) relative to the total of the structural units (I), (II), and (III) was 70 mol %. The content of the structural unit (IV) relative to the total of the structural units (IV) and (V) was 65 mol %. The total of the structural units (II) and (III) was equimolar to the total of the structural units (IV) and (V).

The melting point of this liquid crystal resin was 310° C., ΔS was $0.8 \times 10^{-3}$ J/g·K, and the melt viscosity measured at 320° C. and a shear rate of 1,000/s using a Koka-type flow tester was 20 Pa·s.

Comparative Example 10

Polymerization was conducted as in EXAMPLE 4 using the same components as EXAMPLE 4 except that the acetylation was conducted at 145° C. for 2 hours.

The reaction was continued for 141 minutes at a final polymerization temperature of 330° C. and a vacuum of 133 Pa. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-14) had 53.8 mol % of a structural unit (structural unit (I)) derived from p-hydroxybenzoic acid, 15 mol % of a structural unit (structural unit (II)) derived from 4,4'-dihydroxybiphenyl, 8.1 mol % of a structural unit (structural unit (III)) derived from hydroquinone, 15 mol % of a structural unit (structural unit (IV)) derived from terephthalic acid, and 8.1 mol % of a structural unit (structural unit (V)) derived from isophthalic acid. The ratio between the structural units derived from the two aromatic diols, i.e., 4,4'-dihydroxybiphenyl and hydroquinone, was 65:35 (structural unit (II):structural unit (III)). The content of the structural unit (I) relative to the total of the structural units (I), (II), and (III) was 70 mol %. The content of the structural unit (IV) relative to the total of the structural units (IV) and (V) was 65 mol %. The total of the structural units (II) and (III) was equimolar to the total of the structural units (IV) and (V).

The melting point of this liquid crystal resin was 308° C., ΔS was $0.9 \times 10^{-3}$ J/g·K, and the melt viscosity measured at 318° C. and a shear rate of 1,000/s using a Koka-type flow tester was 19 Pa·s.

Comparative Example 11

To 100 parts by weight of the liquid crystal resin (A-5) prepared in COMPARATIVE EXAMPLE 1, 50 parts by weight of glass fibers (ECS03T-747H produced by Asahi Electric Glass Co., Ltd) were added. The resulting mixture was kneaded in a twin-shaft extruder at 350° C. and pelletized. The amounts of gas generated were determined by the same method as in EXAMPLE 5.

TABLE 1

| | Components | | | Results | | |
|---|---|---|---|---|---|---|
| | LC resin 100 parts by weight | Filler (parts by wt) | Structural units derived from aromatic diols (molar ratio) | Residual amount of monoacetyl derivative of DHB (%) | Residual amount of monoacetyl derivative of HQ/DHN (%) | Acetic acid gas (ppm) |
| EXAMPLE 1 | A-1 | — | DHB/HQ = 70/30 | 0 | 2.2 | 1 |
| EXAMPLE 2 | A-2 | — | DHB/HQ = 70/30 | 0 | 2.2 | 4 |
| EXAMPLE 3 | A-3 | — | DHB/DHN = 89/11 | 0 | 2.1 | 2 |
| EXAMPLE 4 | A-4 | — | DHB/HQ = 65/35 | 0 | 1.8 | 2 |
| EXAMPLE 5 | A-1 | Glass fibers (50) | DHB/HQ = 70/30 | 0 | 2.2 | 0 |
| C. Ex.* 1 | A-5 | — | DHB/HQ = 70/30 | 0 | 0 | 112 |
| C. Ex. 2 | A-6 | — | DHB/HQ = 70/30 | 0 | 0.1 | 108 |
| C. Ex. 3 | A-7 | — | DHB/HQ = 70/30 | 0 | 0 | 118 |
| C. Ex. 4 | A-8 | — | DHB/HQ = 70/30 | 0 | 0.2 | 105 |
| C. Ex. 5 | A-9 | — | DHB/HQ = 70/30 | 1.0 | 5.2 | 0 |
| C. Ex. 6 | A-10 | — | DHB = 100 | 0 | — | 112 |
| C. Ex. 7 | A-11 | — | DHB = 100 | Predetermined torque was not reached. | | |
| C. Ex. 8 | A-12 | | DHB/HQ = 70/30 | 0 | 0.4 | 120 |
| C. Ex. 9 | A-13 | | DHB/HQ = 65/35 | 0 | 0.2 | 142 |
| C. Ex. 10 | A-14 | | DHB/HQ = 65/35 | 0.8 | 4.2 | 8 |
| C. Ex. 11 | A-5 | Glass fibers (50) | DHB/HQ = 70/30 | 0 | 0 | 118 |

| | Results | | | | |
|---|---|---|---|---|---|
| | Phenol gas (ppm) | Carbon dioxide gas (ppm) | Bulging (No.) | Metal corrosion | Glass clouding (hour) |
| EXAMPLE 1 | 7.2 | 50 | 0 | A | 50< |
| EXAMPLE 2 | 12.8 | 87 | 5 | A | 42 |
| EXAMPLE 3 | 8.9 | 72 | 2 | A | 50< |
| EXAMPLE 4 | 10.0 | 60 | 0 | A | 48 |
| EXAMPLE 5 | 6.9 | 48 | 0 | A | 50< |
| C. Ex.* 1 | 40.0 | 120 | 83 | C | 2 |
| C. Ex. 2 | 28.0 | 148 | 149 | C | 8 |
| C. Ex. 3 | 48.0 | 182 | 310 | C | 2 |
| C. Ex. 4 | 42.0 | 108 | 28 | C | 6 |
| C. Ex. 5 | 220.0 | 209 | 520 | C | 1 |
| C. Ex. 6 | 54.0 | 124 | 102 | C | 2 |
| C. Ex. 7 | Predetermined torque was not reached. | | | | |
| C. Ex. 8 | 118.0 | 124 | 89 | C | 0.5 |
| C. Ex. 9 | 34.0 | 94 | 19 | B | 7 |
| C. Ex. 10 | 56.0 | 112 | 65 | C | 2 |
| C. Ex. 11 | 41.0 | 118 | 48 | C | 4 |

DHB: a structural unit derived from 4,4'-dihydroxybiphenyl
HQ: a structural unit derived from hydroquinone
DHN: a structural unit derived from 2,6-dihydroxynaphthalene Table 1 clearly shows that the liquid crystal resins of EXAMPLES generate lower amounts of gas when compared with liquid crystal resins of COMPARATIVE EXAMPLES wherein the terminals are not controlled. Moreover, the molded articles prepared from the invention liquid crystal resins suffer less from bulging, no metal corrosion occurs, and no clouding occurs on glass surfaces.

Example 6

The liquid crystal resin (A-1) prepared in EXAMPLE 1 was formed into a film using a film forming apparatus having a T-die connected to a vent-type twin-shaft extruder having via a die plate at a temperature of the melting temperature of the liquid crystal resin +20° C. The T-die has two manifolds forming two flow paths, one at the upper right of the die and the other one at the lower left of the die. Each path is formed such that the vertical length thereof gradually decreases towards a position 2 mm upstream of the lip while the horizontal length thereof gradually increases toward the same position. In the upper right manifold, the vertical length at the right side is always smaller than the vertical length at the left side. The two manifolds were narrowed to a thickness of 0.1 mm at the position 2 mm upstream of the lip. At the position 2 mm upstream of the lip, the two resin flows from the two manifolds combine by being vertically stacked on the top of each other, are introduced into the lip having an aperture of 0.2 mm in width, and are discharged.

The resulting film had smaller anisotropy. No defects, such as bubbles and fish eyes were observed.

The resulting film was thermally press-bonded onto a copper foil 0.1 mm in thickness at a temperature of the melting point of the liquid crystal resin −5° C. The resulting laminate was heated for 200 hours in an oven at 250° C. The change of color and corrosion of the copper film were visually observed. No color change or corrosion was observed.

Comparative Example 12

A film was formed using the liquid crystal resin (A-12) prepared in COMPARATIVE EXAMPLE 8 using the same equipment as in EXAMPLE 6.

The resulting film had anisotropy and longitudinal cracks were readily observed in a direction parallel to the discharge direction. Moreover, minute bubbles were observed at the ends of the film in the width direction.

The corrosion test was conducted as in EXAMPLE 6. The copper foil turned red and corrosion was observed at the end portions.

A film prepared from the liquid crystal resin of the present invention has small anisotropy and is free from any defects, such as bubbles. Thus, a high-quality film can be produced in high yields according to the present invention.

Since the resin has significantly low corrosiveness to copper, a film suitable for use as materials for copper clad circuit boards.

Example 7

In a 5 L reactor equipped with a stirring blade and a reflux duct, 870 parts by weight of p-hydroxybenzoic acid, 327 parts by weight of 4,4'-dihydroxybiphenyl, 89 parts by weight of hydroquinone, 292 parts by weight of terephthalic acid, 157 parts by weight of isophthalic acid, and 1433 parts by weight (1.08 equivalents of the total of the phenolic hydroxyl groups) of acetic anhydride were charged. The resulting mixture was subjected to reaction at 148° C. for 2.5 hours in nitrogen gas atmosphere with stirring. Upon termination of the acetylation, the resulting mixture was heated to 330° C. over 4 hours. Subsequently, the polymerization temperature was retained at 330° C., and stirring was conducted for 1 hour under heating. The pressure was then reduced to 133 Pa in 1.0 hour, and the reaction was further continued for 60 minutes. The polycondensation was terminated when the torque reached 20 kgcm. The interior of the reactor was then pressurized to 0.1 MPa, and the resulting polymer was discharged via a die having a circular discharge port having a diameter of 10 mm so that the polymer was discharged in the form of strands. The polymer strands were pelletized using a cutter.

The resulting liquid crystal resin (A-15) had 53.85 mol % of a structural unit (structural unit (I)) derived from p-hydroxybenzoic acid, 16.15 mol % of a structural unit (structural unit (II)) derived from 4,4'-dihydroxybiphenyl, 6.92 mol % of a structural unit (structural unit (III)) derived from hydroquinone, 15 mol % of a structural unit (structural unit (IV)) derived from terephthalic acid, and 8.08 mol % of a structural unit (structural unit (V)) derived from isophthalic acid. The ratio between the structural units derived from the two aromatic diols, i.e., 4,4'-dihydroxybiphenyl and hydroquinone, was 70:30 (structural unit (II):structural unit (III)). The content of the structural unit (I) relative to the total of the structural units (I), (II), and (III) was 70 mol %. The content of the structural unit (IV) relative to the total of the structural units (IV) and (V) was 65 mol %. The total of the structural units (II) and (III) was equimolar to the total of the structural units (IV) and (V).

The melting point of this liquid crystal resin was 318° C., $\Delta S$ was $0.65 \times 10^{-3}$ J/g·K, and the melt viscosity measured at 328° C. and a shear rate of 1,000/s using a Koka-type flow tester was 16 Pa·s.

Using the liquid crystal resin, fibers were produced by spinning at a temperature and a draft ratio shown in Table 2 using a spinning machine equipped with a spinning nozzle having the basic structure shown in FIG. 1 and dimensions described below, a twin-shaft extruder, a sand pack, and a spinning twister.

Nozzle: nozzle length (La+Lb+Lt): 10 mm
    Diameter Da of upper lead-in hole: 1.5 mm
    Diameter Db of lower spinning hole: 0.15 mm
    [Length of taper/entire nozzle length]×100(%) ([Lt/(La+Lb+Lt)]×100): 99.9%
    Length La of the straight portion: 0 mm
    Length Lb of the straight portion: 0.01 mm
    Cone angle: 7.7°

The produced fibers were evaluated as (6) to (9) below. The results are shown in Table 2.

(6) Fineness and Fineness Variation

Using a winding machine, 10 m of the fibers was wound. The weight thereof was determined to calculate the fineness. This operation was performed 50 times, and the average values are shown in Table 2. As for the variation of the fineness, the greater one of the absolute value of the difference between the average value and the maximum value and the absolute value of the difference between the average value and the minimum value was defined as the fineness variation:

Fineness variation (%)=|(maximum or minimum value)−average value|/average value)×100

(7) Fiber Strength and Fiber Strength Variation (Filaments Not Subjected to Solid-Phase Polymerization)

The fiber strength was determined according to JIS L1013 using Tensilon UCT-100 produced by Orientec Co., Ltd. The number of samples was 50. The average value of the fiber strength is shown in Table 2.

As for the variation of the fiber strength, the greater one of the absolute value of the difference between the average value and the maximum value and the absolute value of the difference between the average value and the minimum value was defined as the fiber strength variation, as follows:

Fiber strength variation (%)=|(maximum or minimum value)−average value|/average value×100

(8) Thermal Expansion Coefficient in the Thickness Direction

Using a stereomicroscope equipped with a temperature controller, two ends of the fiber were restrained at a tensile force of 0.01 N/cm². While measuring the outer diameter of this fiber using a microscopic meter, the fiber was heated. The change in the fiber outer diameter between 30° C. and 200° C. was calculated, and the obtained value was defined as the thermal expansion coefficient in the thickness direction of the fiber:

Thermal expansion coefficient (ppm/° C.)=[(outer diameter at 200° C.−outer diameter at 30° C.)/(outer diameter at 30° C.)]/(200−30)×10⁶

(9) Melt Heat Ratio ($\Delta Hm_1/\Delta Hm_2$)

The fiber was measured by differential calorimetry. The melt heat ($\Delta Hm_1$) at the endothermic peak ($Tm_1$) measured by heating the resin from room temperature at a heating rate of 20° C./min was determined. The fiber was then retained at $Tm_1$ +20° C. for 5 minutes, cooled to room temperature at a cooling rate of 20° C./min, and heated again at a heating rate of 20° C./min, during which an endothermic peak ($Tm_2$) was observed. The heat melt ($\Delta Hm_2$) (J/g) at the endothermic peak ($Tm_2$) was then determined.

The melt heat ratio was determined according to the equation below:

$$\text{Melt heat} = \Delta Hm_1/\Delta Hm_2 \quad (2)$$

Comparative Example 13

In a 5 L reactor equipped with a stirring blade and a reflux duct, 994 parts by weight of p-hydroxybenzoic acid, 1,126 parts by weight of 4,4'-dihydroxybiphenyl, 112 parts by weight of terephthalic acid, 216 parts by weight of polyethylene terephthalate having a intrinsic viscosity of about 0.6 dl/g, and 960 parts by weight (1.045 equivalents of the total of the phenolic hydroxyl groups) of acid anhydride were charged. The resulting mixture was heated from room temperature to 145° C. over 30 minutes with stirring, retained at 145° C. for two hours under heating with stirring, and then heated from 145° C. to 325° C. over four hours. The pressure was decreased to 1.0 mmHg (133 Pa) over 1.5 hours, and the reaction was further continued for 11 minutes. When the torque reached 15 kgcm, the polycondensation was terminated. The interior of the reactor was then pressurized to 1.0 kg/cm² (0.1 MPa), and the resulting polymer was discharged via a die having a circular discharge port having a diameter of 10 mm so that the polymer was discharged in the form of strands. The polymer strands were pelletized using a cutter.

The resulting liquid crystal resin (A-16) had 74.42 mol % of a structural unit derived from p-hydroxybenzoic acid, 6.98 mol % of a structural unit derived from 4,4'-dihydroxybiphenyl, 6.98 mol % of a structural unit derived from terephthalic acid, and 11.62 mol % of a structural unit derived from polyethylene terephthalate. The melting point was 314° C., and $\Delta S$ was $1.36 \times 10^{-3}$ J/g·K. The melt viscosity measured at 324° C. and a shear rate of 1,000/s using a Koka-type flow tester was 15 Pa·s.

Fibers were prepared as in EXAMPLE 7 except that the produced liquid crystal resin was used and that the spinning temperature and the draft ratio were controlled as shown in Table 2. The fibers were heated at 250° C. for two hours, 260° C. for 2 hours, and 270° C. for 6 hours in a nitrogen gas atmosphere to conduct solid-phase polymerization. The results are shown in Table 2.

TABLE 2

| | Liquid crystal resin | | | Spinning conditions | | | | | | |
|---|---|---|---|---|---|---|---|---|---|---|
| | Liquid crystal resin | Melting point (° C.) | $\Delta S \times 10^{-3}$ (J/g · K) | Spinning nozzle | Taper length/ nozzle length (%) | Cone angle θ (°) | Lead-in hole diameter (mm) | Spinning hole diameter (mm) | Taper length Lt (mm) | Length La of straight portion at lead-in hole side (mm) | Length Lb of straight portion at spinning hole side (mm) |
| EXAMPLE 7 | A-15 | 318 | 0.65 | B-1 | 99.9 | 7.7 | 1.5 | 0.15 | 9.99 | 0 | 0.01 |
| C. EX*. 13 | A-16 | 314 | 1.36 | B-1 | 99.9 | 7.7 | 1.5 | 0.15 | 9.99 | 0 | 0.01 |

| | Spinning conditions | | | Results | | | | |
|---|---|---|---|---|---|---|---|---|
| | Spinning temperature (° C.) | Draft ratio | Fineness (dtex) | Fineness variation (%) | Strength of fiber not subjected to solid-phase polymerization (cN/dtex) | Strength variation (%) | Thermal expansion coefficient in the cross-sectional direction of the fiber (ppm/° C.) | $\Delta Hm_1/ \Delta Hm_2$ |
| EXAMPLE 7 | 340 | 10 | 19 | 0.1 | 21.0 | 0.8 | 48 | 1.21 |
| C. EX*. 13 | 335 | 8.2*¹ | 36 | 5.1 / 14.6*² | 11.2 / 18.9*² | 6.0 / 12.0*² | 480 / 66*² | 4.8 / 12.1*² |

*COMPARATIVE EXAMPLE

*¹Fiber broke when the draft ratio was increased to the indicated value or more.

*²The value after the solid-phase polymerization

As is apparent from Table 2, according to EXAMPLES, liquid crystal resin fibers having a diameter as fine as 21 dtex in fineness were stably obtained by smelt spinning, and the resulting liquid crystal resin fibers had significantly small fineness variation. The liquid crystal resin fibers produced by melt, spinning but without solid-phase polymerization had significantly high strength and low strength variation. This shows that highly reliable high-strength fibers can be produced at low costs. Moreover, the liquid crystal resin fibers of the present invention have a notably improved dimensional variation in the fiber cross-sectional direction. Thus, the fibers are particularly useful.

The liquid crystal resin of the present invention generates very low amounts of gas, and the molded article produced from the liquid crystal resin rarely bulge at the surface. When the molded article was used in combination with a transparent component, such as glass or plastic, no clouding occurs on this transparent component. Moreover, when the molded article is used by coming into contact with a metal component, no corrosion occurs in the metal component. Thus, the liquid crystal resin of the present invention is optimum for electric and electronic applications.

The film of the present invention has extremely low copper corrosiveness and is thus preferable as materials for copper clad circuit boards.

In the fibers of the present invention, highly reliable high-strength fibers having high strength and low strength variation can be produced at low costs by melt spinning without requiring solid-phase polymerization. The liquid crystal resin fibers of the present invention have significantly improved dimensional stability in the fiber cross-sectional direction and are particularly useful

The invention claimed is:

1. A method for making a liquid crystal resin, comprising performing acetylation reaction between phenolic hydroxyl groups contained in a raw material comprising at least two types of aromatic diols and 1.03 to 1.09 mol equivalents of acid anhydride based on the total of the phenolic hydroxyl groups at a temperature of 140° C. to 150° C. for 2.1 to 2.9 hours; and subsequently performing polycondensation, wherein the acetylation reaction is performed until the residual amount of a monoacetyl derivative of an aromatic diol (A) determined from the equation below reaches 0.8 to 5 mol % of the amount of the aromatic diol (A) initially charged, the aromatic diol (A) being an aromatic diol in which the rate of conversion from monoacetyl derivatives to diacetyl derivative is the lowest among the aromatic diols:

$$\text{Residual amount of monoacetyl derivative (mol \%)} = \{[\text{monoacetyl derivative}]/[\text{monoacetyl derivative}]+[\text{diacetyl derivative}])\} \times 100$$

wherein [monoacetyl derivative] represents the molar amount of the monoacetyl derivatives of the aromatic diol (A), and [diacetyl derivative] represents the molar amount of the diacetyl derivatives of the aromatic diol (A) and wherein the liquid crystal resin comprises structural units derived from at least two types of aromatic diols, wherein the liquid crystal resin generates 100 ppm or less of acetic acid gas, less than 20 ppm of phenol gas, and less than 100 ppm of carbon dioxide gas when the liquid crystal resin is retained at a melting point +10° C. or, at 335° C. when the melting point is less than 325° C., for 30 minutes in a helium gas atmosphere.

2. A method according to claim 1, wherein the two types of aromatic diols are selected from a group consisting of 4,4'-dihydroxybiphenyl, hydroquinone, resorcinol, tert-butylhydroquinone, phenylhydroquinone, chlorohydroquinone, 2,6-dihydroxynaphthalene, 2,7-dihydroxynaphthalene, 3,4'-dihydroxybiphenyl, 2,2-bis(4-hydroxyphenyl)propane, and 4,4'-dihydroxydiphenyl ether.

3. A method according to claim 1, wherein the two types of aromatic diols are selected from a group consisting of 4,4'-dihydroxybiphenyl, hydroquinone, and 2,6-dihydroxynaphthalene.

4. A method according to claim 1, wherein the two types of aromatic diols are 4,4'-dihydroxybiphenyl and hydroquinone.

5. A method for making a molded article comprising further processing the liquid crystal resin which is obtained by the method of claim 1.

6. A method for making a film comprising further processing the liquid crystal resin which is obtained by the method of claim 1.

7. A method for making a fiber comprising further processing the liquid crystal resin which is obtained by the method of claim 1.

* * * * *